Patented Dec. 21, 1948

2,456,717

UNITED STATES PATENT OFFICE 2,456,717

IMPREGNATING COMPOSITION COMPRISING COUMARONE INDENE RESIN, CETYL ACETAMIDE, AND ETHYL CELLULOSE

William P. Lowden, Pitman, N. J., assignor to Radio Corporation of America, a corporation of Delaware No Drawing. Application February 16, 1945, Serial No. 578,362

5 Claims. (Cl. 260—17)

The present invention relates to a composition of matter and more particularly to an insulating compound for the protection of coils and other electrical units.

Conditions at the present time imposed upon electrical equipment, and particularly upon radio operation in the field, stress the importance of temperature, humidity and vibration resistance over varied and sudden extremes. Consequently, coil operating conditions have become much more critical and the prevailing waxes and compounds now commonly used have been inadequate as an answer to the problem now presented.

Some of the objects of the present invention are: to provide a new and greatly improved coil impregnant; to provide a compound having a wide operating range, for example —55° C. to 115° C. or better, which involves no cracking at the low end and no drift at the upper end; to provide a compound having very good resistance to moisture absorption; to provide a compound having low dielectric constant and power factor; to provide a compound having a satisfactory viscosity range for normal commercial impregnation; and to provide other novel characteristics as will hereinafter appear.

Preferably, the base of the compound of the present invention is selected from the resins belonging to the coumarone-indene family which are obtained by the polymerization of coke oven distillates. This family of resins exhibit low power factor, good dielectric, heat stability, corrosion resistance, and good moisture resistance properties. The invention is not limited to a base consisting solely of the aforementioned family since variations in physical properties are attainable by blending in varying amounts of a thermoplastic terpene resin and/or an oil soluble polystyrene resin.

As a diluent and penetrant with plasticizing properties the vegetable types of oil such as soybean, oiticica and castor can be used. A preferred diluent is hydrogenated methyl abietate, which is a viscous, non-volatile liquid capable of exerting a very beneficial plasticizing influence at very low temperature.

In order to impart the necessary toughness with flexibility over a wide temperature range, it is preferred to use ethyl cellulose, which is a cellulose ether made by the reaction of ethyl chloride upon alkaline cellulose. It is a white granular product having good thermal stability, electrical and thermoplasticity properties. Of the various types available, it is preferable to use a fairly high viscosity grade in the range of 46.8 to 48.5% ethoxyl content for solubility and compatibility are best suited for obtaining the desired properties consistent with compound mobility.

For securing cold flow resistance it is preferred to use a synthetic wax in combination with ethyl cellulose. Such a wax can be a high molecular weight aliphatic amide, diamide or triamide. A typical illustration is cetyl acetamide which has a high melting point and exhibits good resistance to oxidation and to water. When heated with ethyl cellulose the tendency is to increase the melting point and impart toughness with flexibility whereby the ultimate effect is improved cold flow properties in the compound.

Resistance to cracking at very low temperatures, —50° C. to —60° C. requires plasticity beyond that afforded by the penetrant and the ethyl cellulose. To enhance this resistance property it is preferred to make use of a plasticizer, such as the ricinoleate, ethylene glycol ethyl ether having the empirical formula $CH_2OC_2H_5CH_2OC_{18}H_{33}O_2$—which has an extremely low solidification point, of around —70° C.

As a stabilizer for the compound, it is preferred to use diphenylamine or phenyl beta naphthylamine. These function generally as a retarder for oxidation, heat deterioration and flex cracking.

One form of the composition of the present invention which has been found to give satisfactory results comprises

| | |
|---|---:|
| Coumarone-indene _____ Per cent__ | 65 |
| Refined soybean oil _____ do____ | 13 |
| Ricinoleate of ethylene glycol ethyl ether _____ do____ | 10 |
| Cetyl acetamide wax _____ do____ | 7 |
| Ethyl cellulose _____ do____ | 5 |
| Stabilizer per 100 parts compound __Part____ | 1 |

Where the compound of the present invention is used for potting purposes, it has been found beneficial in respect to thermal properties to incorporate varying amounts of mineral fillers, such as mica and silica, alone or in combination with the fiber type of filler, such as fiber glass. For example, such a composition would consist of 65 to 90 parts of compound and 35 to 10 parts of filler.

In preparing the novel compound, it is preferred to use the hot melt method of blending and compounding because this affords a very direct, rapid and economical means of processing. For commercial batching a stainless steel kettle equipped with an agitator and heated directly is used and the resin is placed therein and wetted with a large portion of the diluent oil to prevent undue local overheating. Heat is now applied and when the resin liquifies a slow but positive agitation is started. The heating raises the temperature quickly to approximately 205 to 210° C. during which period the wax and stabilizer are added. The ethyl cellulose, previously wetted with the balance of the oil and a portion of the plasticizer to facilitate dissolution, is introduced when the maximum temperature is attained. After the ethyl cellulose is practically dissolved the balance of the plasticizer is introduced and brings the temperature down to 190 to 195° C. where the batch is held until finished, which is determined by a sample yielding a smooth and uniform film. Agitation is then stopped and the batch allowed to de-aerate while cooling to a lower temperature for unloading into containers.

The compound so processed is very light brown in color, very flexible and somewhat tacky. Its density at 25° C. is 1.07. The flash point is 238° C. and the fire point 296° C. The ball and ring softening point is 118–121° C. It is non-corrosive under a direct current potential applied in an atmosphere of 100° F. and 92% relative humidity. The dielectric constant is 2.5 at 25° C. and a frequency of 1 megacycle. The power factor under similar conditions is 1.5%. Coils impregnated with the compound exhibit no cracking at −55° C. and no drift at 115° C. Repeated cycling of coils wound on glass forms followed by immersion in water for twenty-four hours, then at room conditions for one hour produces practically no drop in Q value with respect to the compound.

From the foregoing it will be apparent that the composition of the invention possesses the properties of a wide operating range; excellent resistance to moisture absorption; good electrical properties; and good resistance to corrosion.

What is claimed is:
1. An impregnating and coating composition having good electrical properties comprising about 65 per cent coumarone-indene resin, about 13 per cent of a penetrant selected from the group consisting of vegetable oils and hydrogenated methyl abietate, about 10 per cent of a plasticizer consisting of the ricinoleate of ethylene glycol ethyl ether, about 7 per cent of cetyl acetamide wax and about 5 per cent ethyl cellulose.

2. A composition according to claim 1 including, in addition, about 1 part stabilizer per 100 parts of said composition.

3. A composition according to claim 2 in which said stabilizer is phenyl beta naphthylamine.

4. A composition according to claim 1 in which said penetrant is refined soybean oil.

5. A composition according to claim 1 including, in addition, 10–35 parts mineral filler per 100 parts of said composition.

WILLIAM P. LOWDEN.

REFERENCES CITED

The following references are of record in the file of this patent:

UNITED STATES PATENTS

| Number | Name | Date |
|---|---|---|
| 2,138,578 | Hershberger | Nov. 29, 1938 |
| 2,142,039 | Abrams et al. | Dec. 27, 1938 |
| 2,290,563 | Kauppi | July 21, 1942 |
| 2,317,372 | Gessler | Apr. 27, 1943 |
| 2,326,811 | Wiggam | Aug. 17, 1943 |
| 2,367,954 | Lum et al. | Jan. 23, 1945 |